US011854156B2

(12) United States Patent
Powers et al.

(10) Patent No.: US 11,854,156 B2
(45) Date of Patent: Dec. 26, 2023

(54) METHOD AND SYSTEM OF MULTI-PASS ITERATIVE CLOSEST POINT (ICP) REGISTRATION IN AUTOMATED FACIAL RECONSTRUCTION

(71) Applicants: Mathew Powers, Boston, MA (US); Xiao Xiao, Queens, NY (US); William A. Kennedy, New York,, NY (US)

(72) Inventors: Mathew Powers, Boston, MA (US); Xiao Xiao, Queens, NY (US); William A. Kennedy, New York,, NY (US)

( * ) Notice: Subject to any disclaimer, the term of this patent is extended or adjusted under 35 U.S.C. 154(b) by 0 days.

(21) Appl. No.: 17/557,446

(22) Filed: Dec. 21, 2021

(65) Prior Publication Data

US 2022/0254128 A1   Aug. 11, 2022

Related U.S. Application Data

(63) Continuation-in-part of application No. 17/001,682, filed on Aug. 25, 2020, which is a
(Continued)

(51) Int. Cl.
*G06T 19/20* (2011.01)
*G06T 5/20* (2006.01)
(Continued)

(52) U.S. Cl.
CPC ............ *G06T 19/20* (2013.01); *G06T 5/20* (2013.01); *G06T 11/60* (2013.01); *G06V 40/165* (2022.01); *G06V 40/171* (2022.01)

(58) Field of Classification Search
CPC .... G06V 40/171; G06V 40/165; G06T 11/60; G06T 19/20; G06T 5/20
See application file for complete search history.

(56) References Cited

U.S. PATENT DOCUMENTS

| 2012/0323581 A1* | 12/2012 | Strietzel | G06T 19/20 704/276 |
| 2013/0201187 A1* | 8/2013 | Tong | G06V 40/172 345/420 |
| 2015/0371080 A1* | 12/2015 | Ngan | G06V 40/167 382/103 |

* cited by examiner

*Primary Examiner* — Phi Hoang

(57) ABSTRACT

In one aspect, a computerized method for implementing a multi-pass iterative closest point (ICP) registration in an automated facial reconstruction process includes the step of providing an automated facial reconstruction process. The method includes the step of detecting that a face tracking application programming interface (API) misalignment has occurred during the automated facial reconstruction process. The method includes the step of implementing a multi-pass ICP process on the face tracking API misalignment by the following steps. One step includes obtaining a first point cloud (PC1) of the automated facial reconstruction process. The method includes the step of obtaining a second point cloud (PC2) of the automated facial reconstruction process. The method includes the step of obtaining a first face mask (mask1) of the automated facial reconstruction process. The method includes the step of obtaining a second face mask (mask2) of the automated facial reconstruction process. The method includes the step of performing a first point cloud (PC1)-to-mask ICP operation by inputting and utilizing PC1 and mask1. A transformation output of the first PC-to-mask ICP operation is provided to a third PC-to-PC ICP and a fourth PC-to-PC ICP. The method includes the step of performing a second PC-to-mask ICP on PC2 and mask2. A transformation output of the second PC-to-mask ICP step is provided to a second PC-to-PC ICP and to the third PC-to-PC ICP. The method includes the step of performing a first PC-to-PC ICP on the PC1 and the PC2. The first PC-to-PC ICP outputs a first transformation of the first PC-to-PC ICP and a first error value of the first PC-to-PC ICP. The method
(Continued)

includes the step of performing a second PC-to-PC ICP on the transformation output by the second PC-to-mask ICP and the PC1. The second PC-to-PC ICP outputs a second transformation of the second PC-to-PC ICP and a second error value of the second PC-to-PC ICP. The method includes the step of performing a third PC-to-PC ICP on the transformation output of the first PC-to-mask ICP and the transformation output of the second PC-to-mask ICP. The third PC-to-PC ICP outputs a third transformation of the third PC-to-PC ICP and a third error value of the third PC-to-PC ICP. The method includes the step of performing a fourth PC-to-PC ICP on the transformation output of the first PC-to-mask ICP and the PC2. The fourth PC-to-PC ICP outputs a fourth transformation of the fourth PC-to-PC ICP and a fourth error value of the fourth PC-to-PC ICP.

9 Claims, 18 Drawing Sheets

Related U.S. Application Data continuation-in-part of application No. 16/888,798, filed on May 31, 2020, now abandoned, which is a continuation of application No. 16/398,242, filed on Apr. 29, 2019, now Pat. No. 10,803,677.

(60) Provisional application No. 62/774,864, filed on Dec. 4, 2018, provisional application No. 62/664,271, filed on Apr. 30, 2018.

(51) Int. Cl.
*G06V 40/16* (2022.01)
*G06T 11/60* (2006.01)

600

800

METHOD AND SYSTEM OF MULTI-PASS ITERATIVE CLOSEST POINT (ICP) REGISTRATION IN AUTOMATED FACIAL RECONSTRUCTION

CROSS-REFERENCE TO RELATED APPLICATIONS

This application claims priority to U.S. patent application Ser. No. 17/001,682 filed on Aug. 25, 2020, titled METHOD AND SYSTEM OF RENDERING A 3D IMAGE FOR AUTOMATED FACIAL MORPHING. This application is incorporated herein by reference in its entirety.

U.S. patent application Ser. No. 17/001,682 is a continuation in part of and claims priority to claims priority to U.S. patent application Ser. No. 16/888,798, titled METHOD AND SYSTEM OF AUTOMATED FACIAL MORPHING FOR EYEBROW HAIR AND FACE COLOR DETECTION and filed on 31 May 2020. This application is hereby incorporated by reference in its entirety.

U.S. patent application Ser. No. 16/888,798 is a continuation in part of and claims priority to U.S. patent application Ser. No. 16/398,242, titled METHOD AND SYSTEM OF AUTOMATED FACIAL MORPHING FOR EYEBROW HAIR AND FACE COLOR DETECTION and filed on 29 Apr. 2019. This application is hereby incorporated by reference in its entirety.

U.S. patent application Ser. No. 16/398,242, titled METHOD AND SYSTEM OF AUTOMATED FACIAL MORPHING FOR EYEBROW HAIR AND FACE COLOR DETECTION claims priority to U.S. provisional patent application Ser. No. 62/664,271, titled METHOD AND SYSTEM OF AUTOMATED FACIAL MORPHING and filed on 30 Apr. 2018. This application is hereby incorporated by reference in its entirety.

U.S. patent application Ser. No. 16/398,242, titled METHOD AND SYSTEM OF AUTOMATED FACIAL MORPHING FOR EYEBROW HAIR AND FACE COLOR DETECTION claims priority to U.S. provisional patent application Ser. No. 62/774,864, titled METHOD AND SYSTEM OF AUTOMATED FACIAL MORPHING and filed on 4 Dec. 2018. This application is hereby incorporated by reference in its entirety.

BACKGROUND

1. Field

This application relates generally to 3D model reconstruction, and more particularly to a system, method, and article of manufacture of multi-pass iterative closest point (ICP) registration in automated facial reconstruction.

2. Related Art

Aesthetic medicine and other cosmetic treatments are increasing in popularity. Treatments in this area can be permanent. Accordingly, patients often wish to view simulations of the final outcome. Patients also prefer to be able to select from a set of possible outcomes. Consequently, various facial morphing methods are used to provide simulated outcomes. However, these methods may use 3D model morphing and often require high levels of computer processing power and specialized algorithms to adequately model each individual patient's face. These may only be available at a cosmetic-treatment doctor's office. However, patients may wish to try various options on their faces prior to visiting the cosmetic-treatment doctor. Accordingly, improvements to methods of rendering a 3D image for automated facial morphing are desired.

BRIEF SUMMARY OF THE INVENTION

In one aspect, a computerized method for implementing a multi-pass iterative closest point (ICP) registration in an automated facial reconstruction process includes the step of providing an automated facial reconstruction process. The method includes the step of detecting that a face tracking application programming interface (API) misalignment has occurred during the automated facial reconstruction process. The method includes the step of implementing a multi-pass ICP process on the face tracking API misalignment by the following steps. One step includes obtaining a first point cloud (PC1) of the automated facial reconstruction process. The method includes the step of obtaining a second point cloud (PC2) of the automated facial reconstruction process. The method includes the step of obtaining a first face mask (mask1) of the automated facial reconstruction process. The method includes the step of obtaining a second face mask (mask2) of the automated facial reconstruction process. The method includes the step of performing a first point cloud (PC1)-to-mask ICP operation by inputting and utilizing PC1 and mask1. A transformation output of the first PC-to-mask ICP operation is provided to a third PC-to-PC ICP and a fourth PC-to-PC ICP. The method includes the step of performing a second PC-to-mask ICP on PC2 and mask2. A transformation output of the second PC-to-mask ICP step is provided to a second PC-to-PC ICP and to the third PC-to-PC ICP. The method includes the step of performing a first PC-to-PC ICP on the PC1 and the PC2. The first PC-to-PC ICP outputs a first transformation of the first PC-to-PC ICP and a first error value of the first PC-to-PC ICP. The method includes the step of performing a second PC-to-PC ICP on the transformation output by the second PC-to-mask ICP and the PC1. The second PC-to-PC ICP outputs a second transformation of the second PC-to-PC ICP and a second error value of the second PC-to-PC ICP. The method includes the step of performing a third PC-to-PC ICP on the transformation output of the first PC-to-mask ICP and the transformation output of the second PC-to-mask ICP. The third PC-to-PC ICP outputs a third transformation of the third PC-to-PC ICP and a third error value of the third PC-to-PC ICP. The method includes the step of performing a fourth PC-to-PC ICP on the transformation output of the first PC-to-mask ICP and the PC2. The fourth PC-to-PC ICP outputs a fourth transformation of the fourth PC-to-PC ICP and a fourth error value of the fourth PC-to-PC ICP.

BRIEF DESCRIPTION OF THE DRAWINGS

The present application can be best understood by reference to the following description taken in conjunction with the accompanying figures, in which like parts may be referred to by like numerals.

Figure 1:
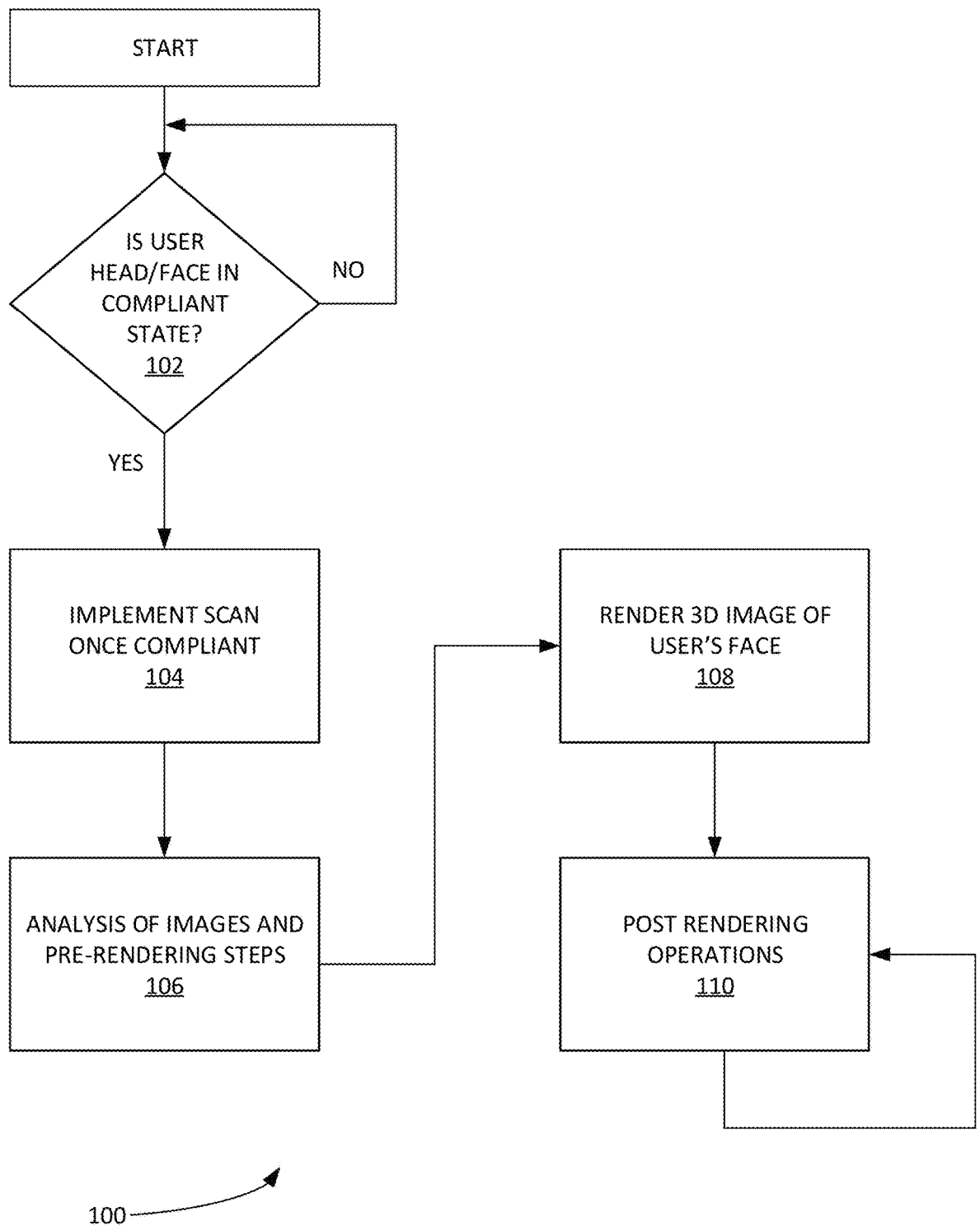
FIG. 1 illustrates an example process for rendering a 3D image for automated facial morphing, according to some embodiments.

The Figures described above are a representative set and are not exhaustive with respect to embodying the invention.

DESCRIPTION

Disclosed are a system, method, and article of manufacture for multi-pass iterative closest point (ICP) registration in automated facial reconstruction. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

ARKit® is an API tool for developers working on virtual reality and augmented reality applications. The ARKit tool can accurately map a surrounding or object using SLAM (Simultaneous Localization and Mapping). Third-party developers can use ARKit to build augmented reality applications, leveraging a mobile device's camera, CPU, GPU, and motion sensors. ARKit can provide a face mesh showing automatic estimation of the real-world directional lighting environment. It is noted that in other embodiments, other relevant tools can be used in lieu of ARKit.

Computer vision is an interdisciplinary field that deals with how computers can be made for gaining a high-level understanding from digital images or videos. From the perspective of engineering, it seeks to automate tasks that the human visual system can do.

Dlib is a general-purpose cross-platform software library written in the programming language C++.

Edge detection includes a variety of mathematical methods that aim at identifying points in a digital image at which the image brightness changes sharply or, more formally, has discontinuities.

Image stitching can include the process of combining multiple photographic images with overlapping fields of view to produce a segmented panorama or high-resolution image.

Iterative closest point (ICP) can be an algorithm employed to minimize the difference between two clouds of points. ICP can implement computationally accurate and efficient registration of 3-D shapes which includes free form curves and surfaces. ICP is often used to reconstruct 3D surfaces from various scans, etc.

Low-pass filter (LPF) is a filter that passes signals with a frequency lower than a selected cutoff frequency and attenuates signals with frequencies higher than the cutoff frequency. The exact frequency response of the filter depends on the filter design.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning.

Marching cubes is a computer graphics algorithm for extracting a polygonal mesh of an isosurface from a three-dimensional discrete scalar field (e.g. a voxel).

OpenCV (Open-Source Computer Vision) is a library of programming functions mainly aimed at real-time computer vision.

Open Graphics Library (OpenGL) is a cross-language, cross-platform application programming interface (API) for rendering 2D and 3D vector graphics.

3D computer graphics can be computer graphics that use a three-dimensional representation of geometric data.

Rendering or image synthesis is the automatic process of generating a photorealistic or non-photorealistic image from a 2D or 3D model (or models in what collectively could be called a scene file) by means of computer programs.

Signed distance function of a set $\Omega$ in a metric space determines the distance of a given point x from the boundary of $\Omega$, with the sign determined by whether x is in $\Omega$. The function has positive values at points x inside $\Omega$, it decreases in value as x approaches the boundary of $\Omega$ where the signed distance function is zero, and it takes negative values outside of $\Omega$.

Texture mapping can be a method for defining high-frequency detail, surface texture, or color information on a computer-generated graphic or 3D model.

Truncated signed distance function (TSDF) can be a volumetric scene representation that enables for integration of multiple depth images taken from different viewpoints.

Voxel represents a value on a regular grid in three-dimensional space. A voxel can be used by a rendering system to infer the position of a voxel-based upon its position relative to other voxels (e.g., its position in the data structure that makes up a single volumetric image).

Example Method for Generating a 3D Model of a User'S Face

FIG. 1 illustrates an example process 100 for 3D morphable image of a user's face, according to some embodiments. In step 102, process 100 can determine whether the user's head/face is in a compliant state? For example, process 100 can determine if the user's face is straight (e.g. the central axis of the user's face is perpendicular to a horizontal plane, etc.). Parameters for a compliant state can include, inter alia: user is looking straight ahead, no hair in user's face, user not smiling, etc. Process 100 can push messages (e.g. text messages with an application, voice-based instructions, haptic feedback, etc.) that instruct the user to, inter alia: "look straight ahead", "pull hair back", "don't smile", etc. Process 100 can repeat the instructions until the user is in a compliant state.

Figure 9:
FIG. 9 shows an example set of digital images obtained from a scan of the user's face, according to some embodiments.

Process 100 can proceed to step 104. In step 104, process 100 can implement a scan of the user's face. FIG. 9 infra shows an example set of digital images obtained from a scan of the user's face, according to some embodiments. The user can place their head in the various positions shown. For example, a user can look to the right, to the center, to the left and the upward. In other example embodiments, other positions and/or sequences of head movement can be utilized. During the movement of the user's head, process 100 can take a series of around 75 images with corresponding depth information (e.g. using from a TrueDepth camera system and/or similar camera system such as described supra, etc.). The mobile device implementing process 100 can obtain the depth information of the various digital images. Process 100 can obtain a series of digital RGB photos in bursts. The digital RGB photos can be combined with the depth information from the depth-sensing camera system. It is noted that in some embodiments, a digital video is not obtained, but rather a series of digital image frames and the depth information corresponding to each respective digital-image frame.

Figure 2:
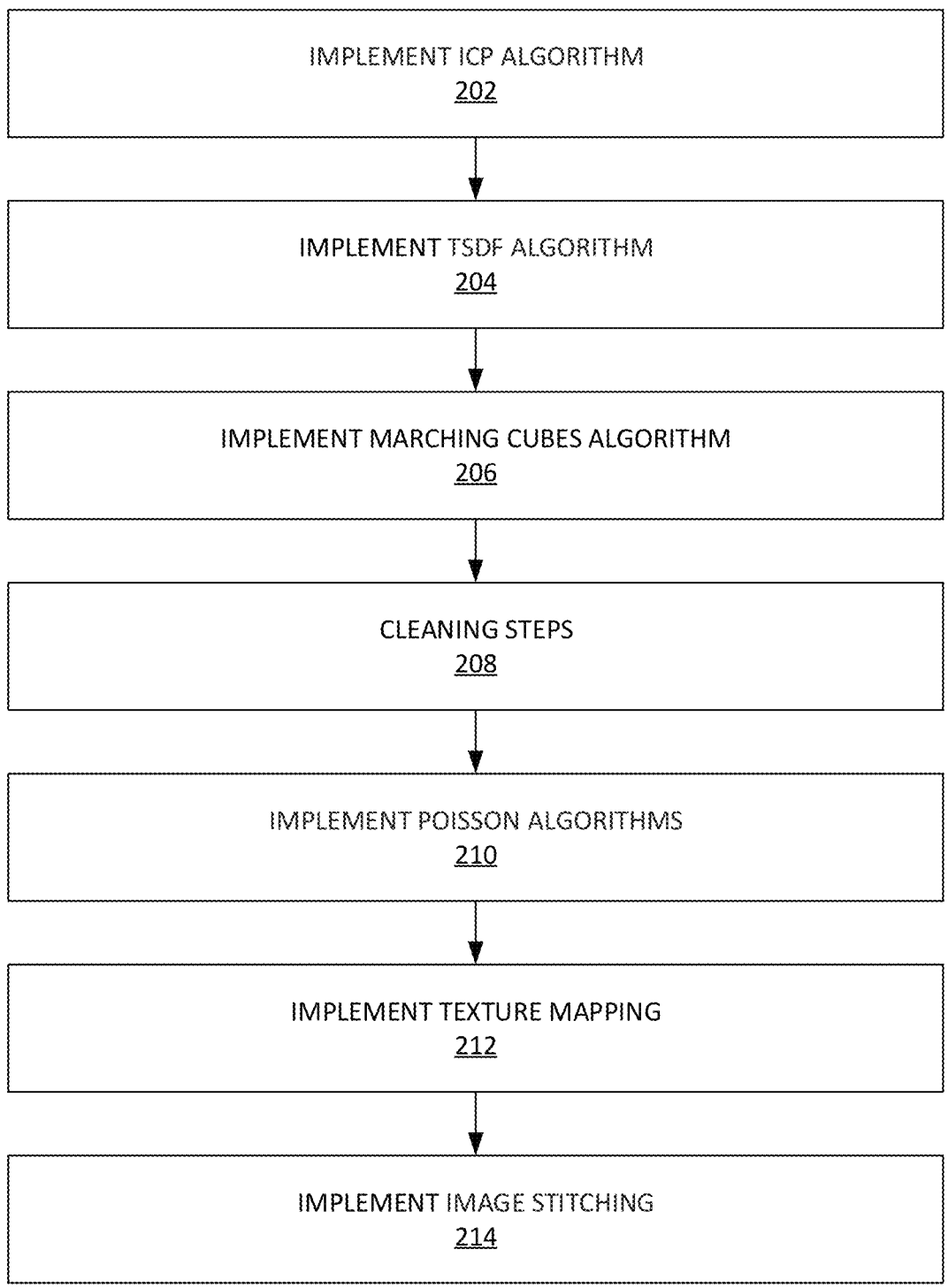
FIG. 2 illustrates an example process for analyzing a set of images obtained for rendering a 3D facial image of a user, according to some embodiments.
Figure 3:
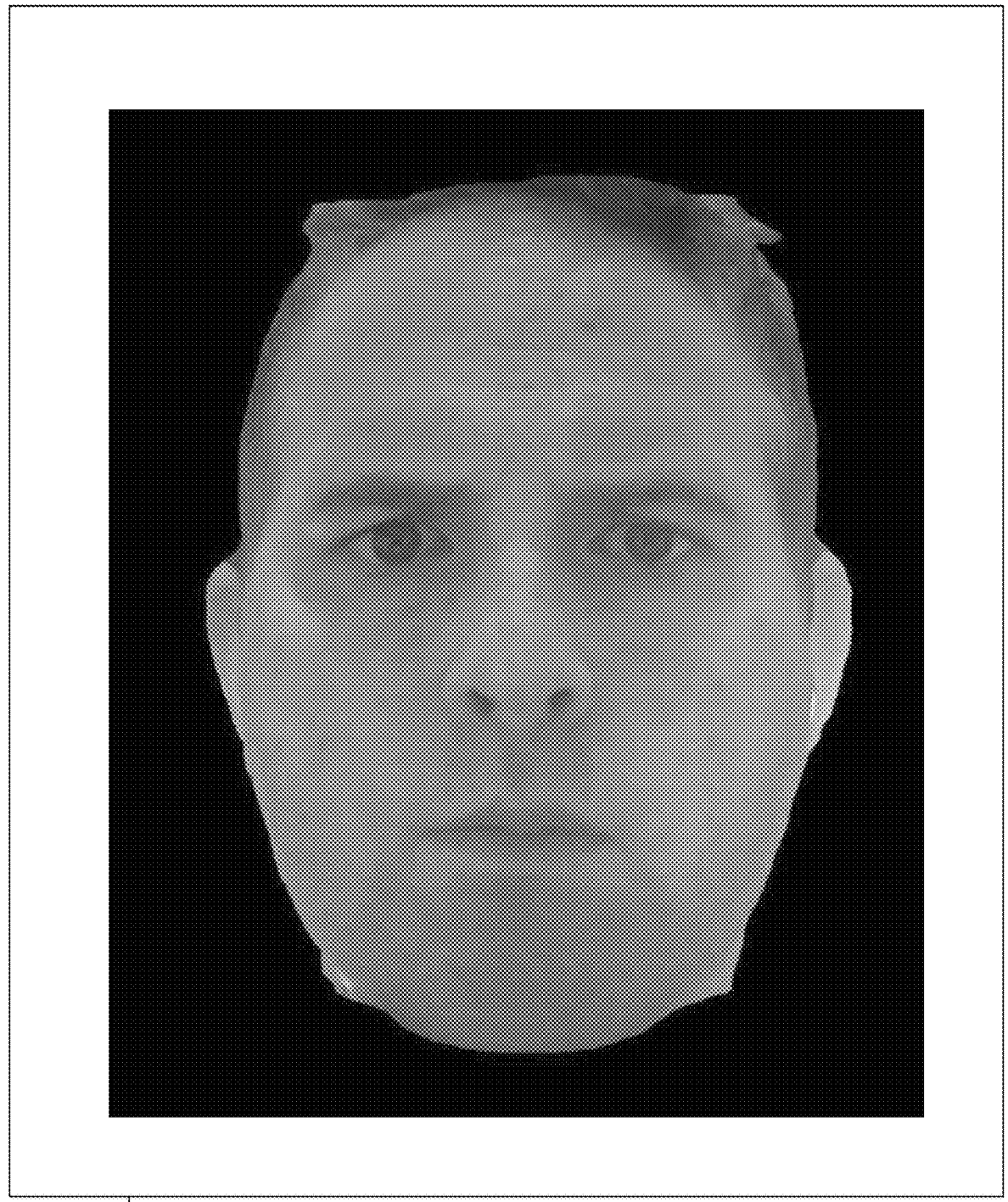
FIGS. 3-8 illustrate a set of example post scan digital images to be utilized by process for generating a 3D model of a user's face.
Figure 4:
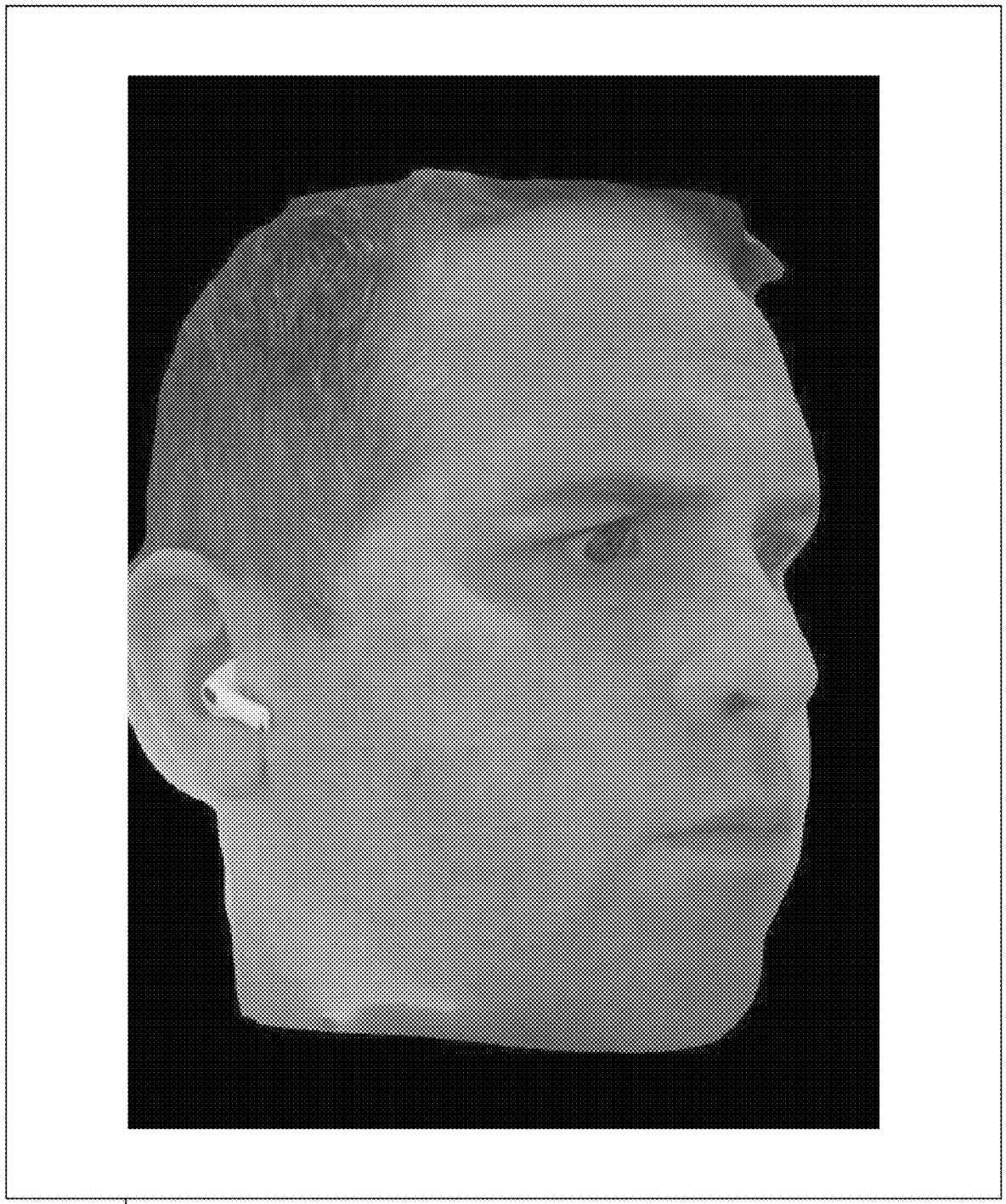
Figure 5:
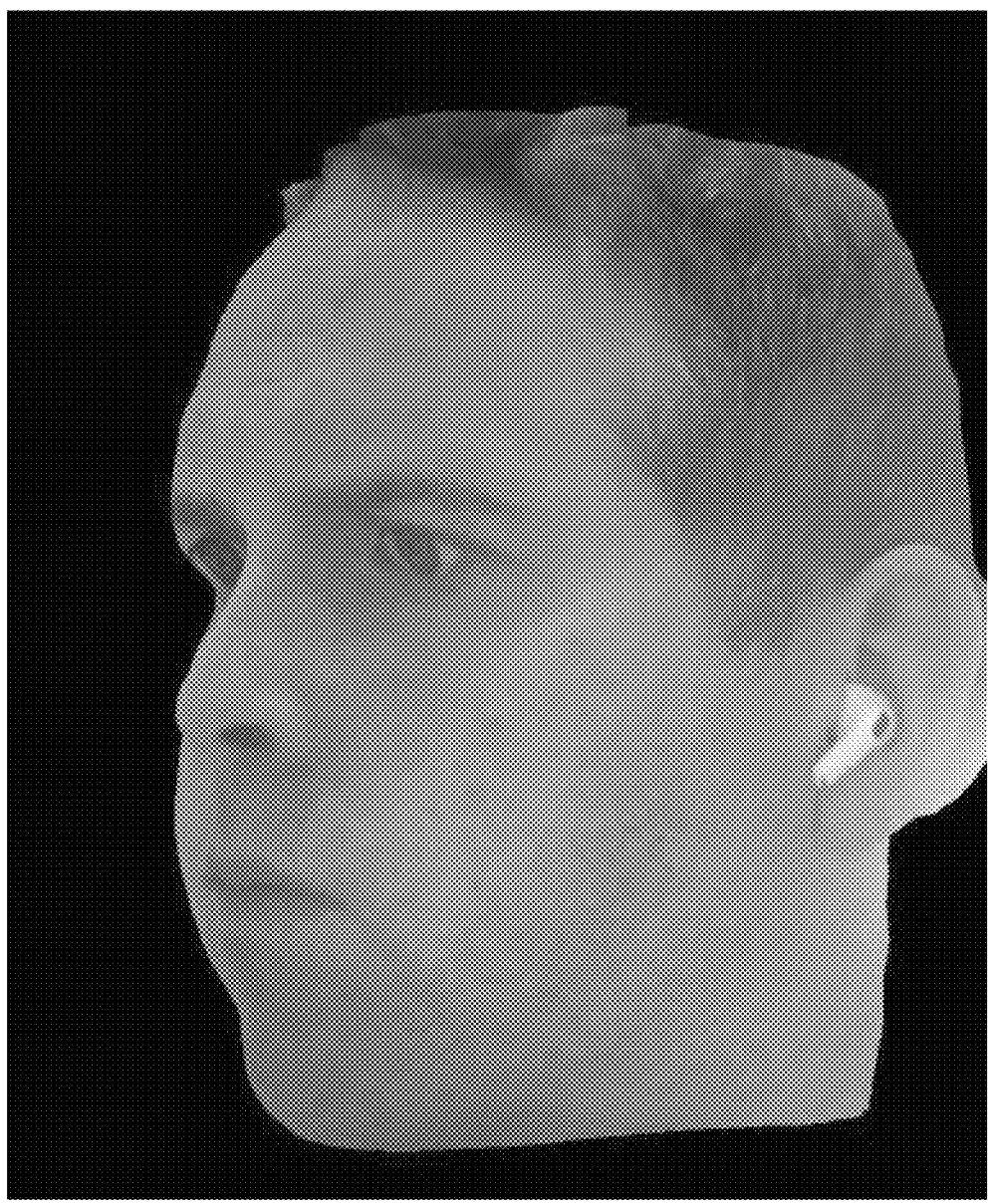
Figure 6:
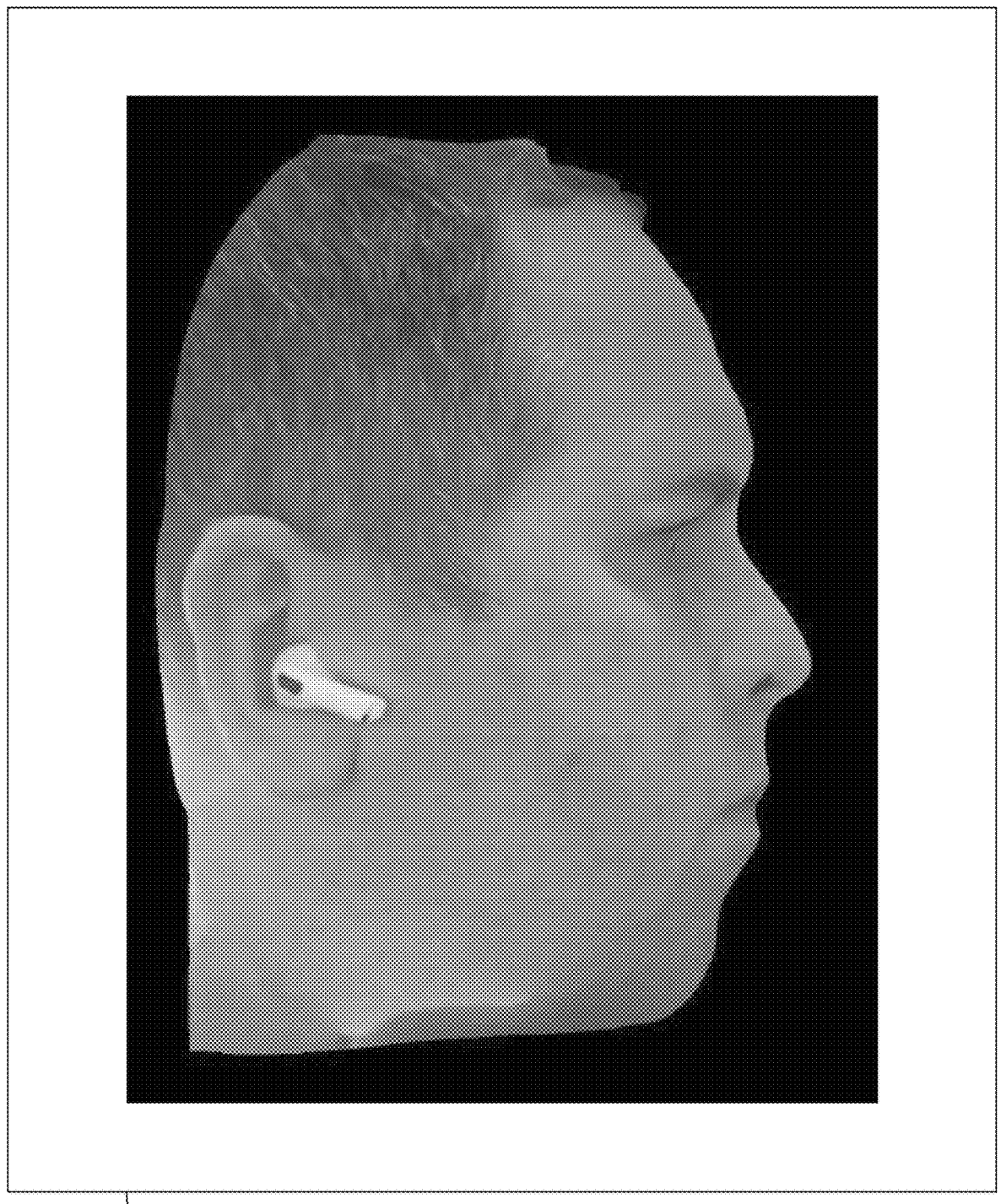
Figure 7:
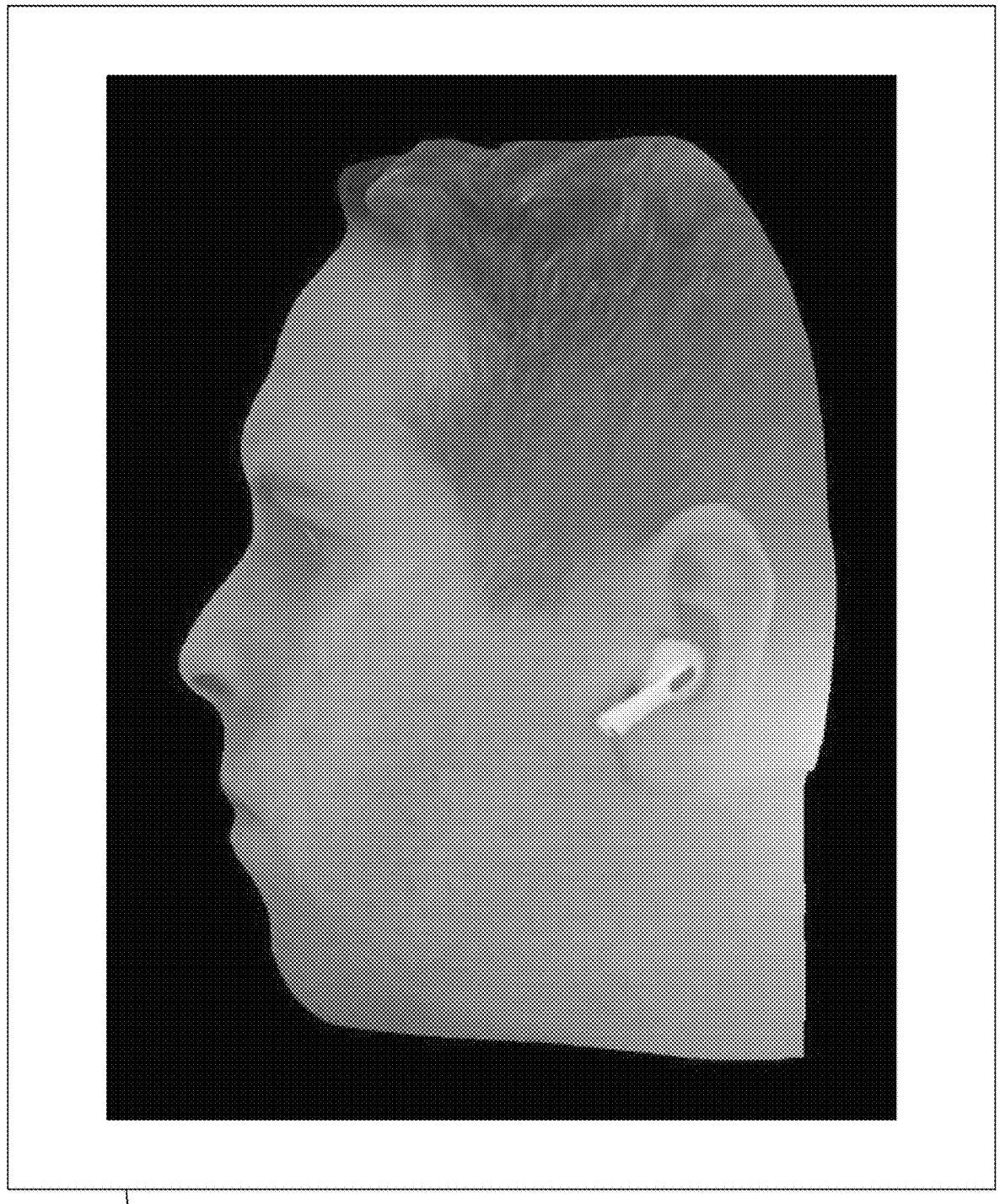
Figure 8:

Process 100 can then proceed to step 106. In step 106, process 100 can implement analysis of digital images and various pre-rendering steps. FIG. 2 illustrates an example process 200 for analyzing a set of images obtained for rendering a 3D facial image of a user, according to some embodiments. Process 200 can be used for processing the digital images post scan but pre-render of the 3D model.

In step 202, process 200 can implement an ICP algorithm (e.g. an OpenCV ICP algorithm, etc.). Process 200 can optimize between a first view and the other views. The points can be chosen by using the ARKit face mask to ensure that they are only located on the user's face. The inputs can include, inter alia: depth image (e.g. a file path), RGB Image (File path), ARKit Facemask (e.g. file path), etc. The ICP stitches together the points from the facemask (e.g. the facemask sits on a user's face) and the correlated images. The outputs of step 202 can include the transformations, etc.

In step 204, process 200 can implement a TSDF algorithm on the output of step 202. The TSDF algorithm represents the points in a regularized voxel grid. The inputs in step 204 include, inter alia: transformations, depth image. The TSDF algorithm can continue to blend and match together with all the digital images. For example, meshes with triangles and vertices of the output of the ICP step 202 can be blended and matched in one uniform object. The output of step 204 includes a voxel representation (e.g. a 1-D array of voxels).

The remaining steps, as shown infra, provide cleaning steps to clear out floating vertices (e.g. an artifact that is outside of the face), fill in holes between meshed together images, implement texture mapping, image stitching (e.g. obtain texture map of the three images and combine and image stitch this into a single image), etc.

In step 206, process 200 can implement a marching cubes algorithm. Step 206 obtains a voxel representation (e.g. 1-D array of voxels). Process 200 can create a 3D mesh out of per-voxel values provided by the TSDF inputs. Step 206 outputs a mesh representation (e.g. triangles and vertices).

In step 208, process 200 implements cleaning algorithms. Step 208 obtains the Mesh Outputs of step 206. Process 200 then cleans the floating vertices and triangles. Process 200 can clean various patches on the back of the head. Process 200 can clean around patches neck. Step 208 can output a mesh (e.g. scattered points with a normal per point).

In step 210, process 200 can implement various Poisson algorithms on the mesh output of step 208. Process 200 uses the Poisson algorithm to fill in the holes of the mesh. The output of step 210 can be a reconstructed mesh that is passed to step 212.

In step 212, process 200 can implement texture mapping. Process 200 can use a cylinder to map the texture constructed by three images coming from the three different views. The inputs of step 212 can be the mesh output of step 210, three RGB images and the transformation matrices calculated through the ICP algorithm. Step 212 can output a texture (e.g. saved as "pixels.png" in a document directory of the mobile-device application). Step 212 can also create a "labels.png" as a mask representation that illustrates each piece of the image comes from a different source.

In step 214, process 200 can implement image stitching. Process 200 can stitch images with different lighting to remove seams. Step 214 can receive the single image consisting of multiple images with different lighting. A label image that consists of one specific label color for each piece of image that comes from different lighting. Step 214 can output one image with consistent lighting over all pieces (e.g. "texture.png").

Returning to process 100, the output of (e.g. the output of process 200) can be provided in step 108. In step 108, process 100 can render the 3D image user's face. The 3D model can be rendered using a custom library with an internal SDK as well. A hardware-accelerated 3D graphic and compute shader application programming interface (API) can be used to render it (e.g. METAL®, etc.). The rendering can be displayed in a mobile-device application display.

In step 110 process 100 can implement post rendering operations (e.g. automated and/or manual facial morphing processes, etc.). Example automated facial morphing processes, can include, inter alia: ability to segregate face into regions for injectables; under-eye bag removal; blepharoplasty morphing; jawline reduction; beard detection; auto-correction of crooked noses; etc. Additional processes that can be implemented with the 3D model include processes 1100-1400 discussed infra.

Example Digital Images

FIGS. 3-8 illustrate a set of example post scan digital images 800 to be utilized by process 200 for generating a 3D model of a user's face. The set of example post scan digital images can be generated from set of digital images 900.

FIG. 9 shows an example set of digital images 900 obtained from a scan of the user's face, according to some embodiments.

Figure 10:
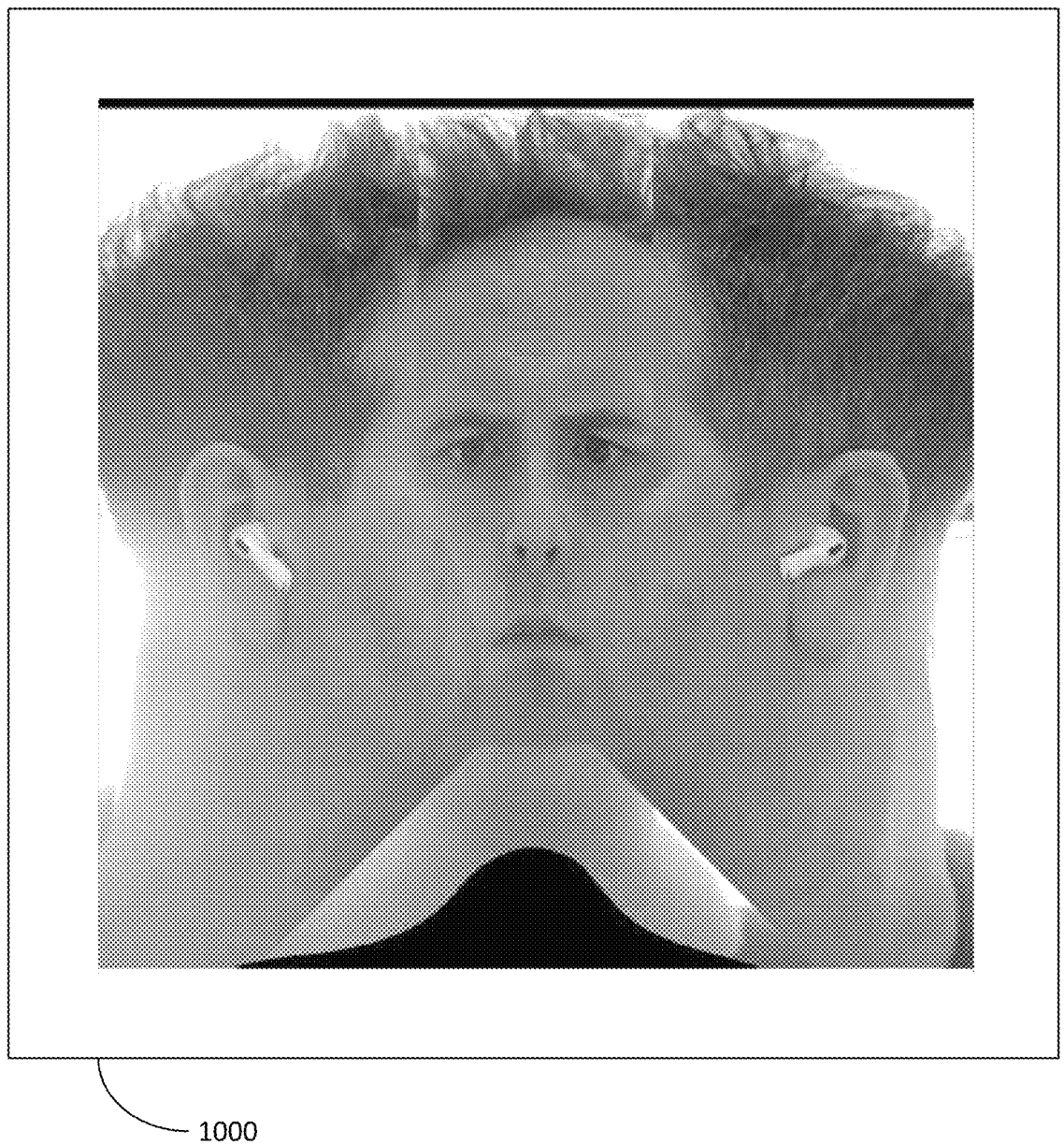
FIG. 10 illustrates an example digital image of a texture map, according to some embodiments. The texture map is generated from the combination of three images that are then flattened out.

FIG. 10 illustrates an example digital image of a texture map 1000, according to some embodiments. The texture map is generated from the combination of three images that are then flattened out.

Additional Example Processes

FIGS. 11-14 illustrate an additional example of automated facial morphing processes according to some embodiments.

Figure 11:
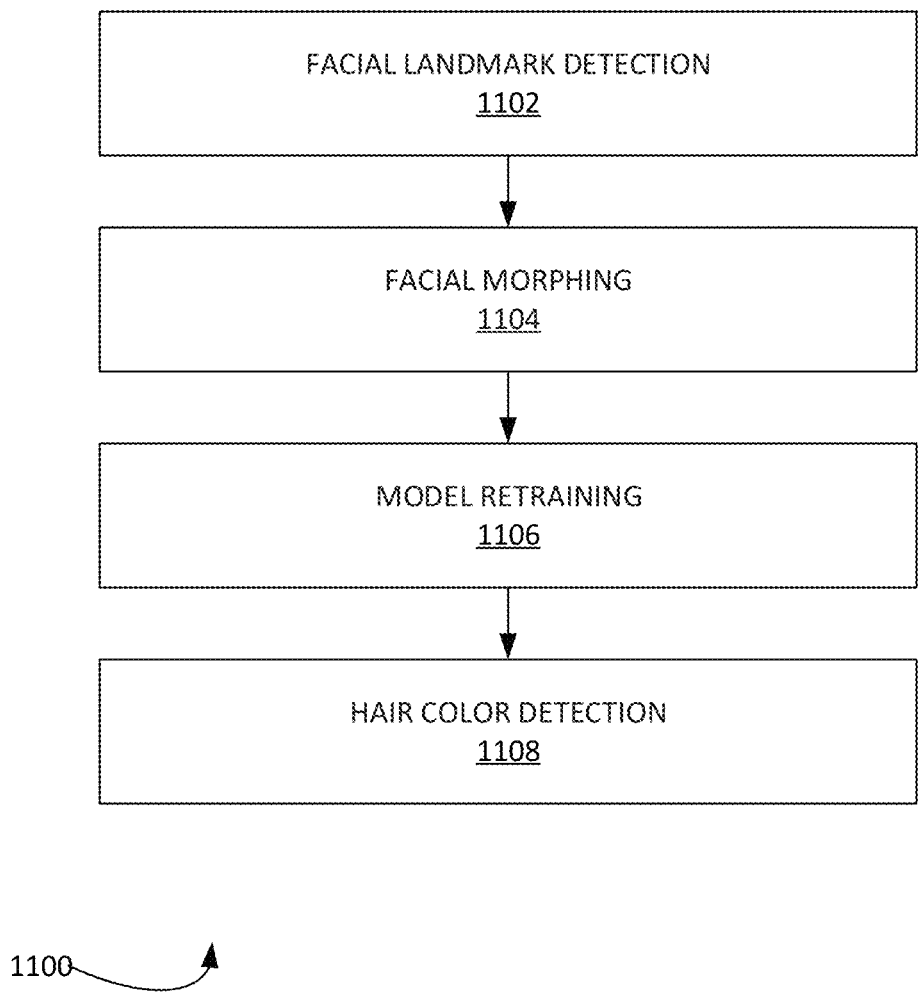
FIG. 11 schematically depicts an example process for automated facial morphing, according to some embodiments.

FIG. 11 schematically depicts an example process 1100 for automated facial morphing, according to some embodiments. More specifically, in step 1102, process 1100 can implement facial landmark detection. In step 1104, process 1100 can implement facial morphing. In step 1106, process 1100 can implement model retraining. In step 1108, process 1100 can implement hair color detection.

Figure 12:
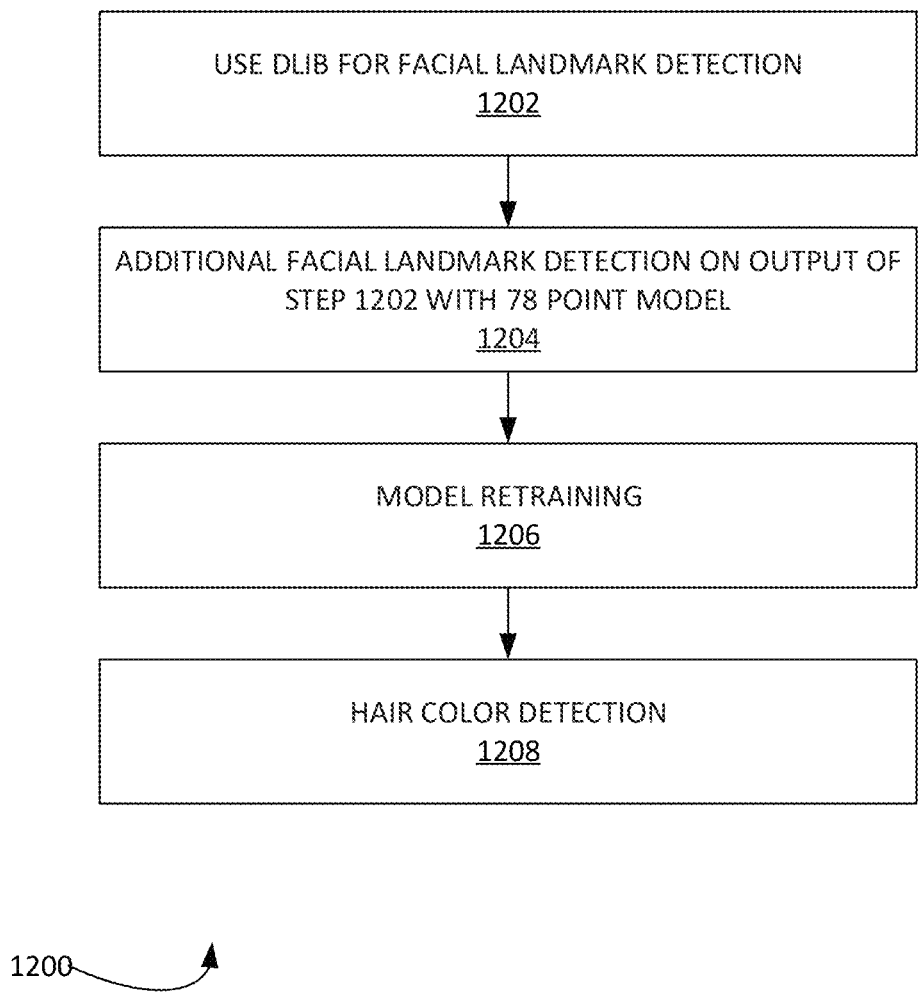
FIG. 12 illustrates an example process for facial landmark detection, according to some embodiments.

FIG. 12 illustrates an example process 1200 for facial landmark detection, according to some embodiments. It is noted that facial landmark detection is different from facial recognition in the sense that landmark detection is the process of identifying facial features on a face. In one example, process 1100 can use various open-source tools (e.g. Dlib, etc.) to do an initial phase of facial landmark detection. However, because of the level of detail that is to be obtained around a specified set of the features, such as: eyebrow, nose, and lip detection. Process 1200 can generate an n-point model (e.g. seventy-eight (78) point model, eighty-five (85) point model, etc.) that provides a higher resolution on the eyebrow in particular.

More specifically, in step 1202, process 1200 can use Dlib for facial landmark detection. In step 1204, process 1200 can use additional facial landmark detection on the output of step 1202 with a higher resolution seventy-eight (78) point model that focuses on the eyebrow region. In step 1206, process 1200 can implement hair/eyelid detection using OpenCV as well as doing fast edge detection using a structured forest model. In step 1208, process 1200 can compensate for poor lighting/face angles using an OpenCV heuristics mechanism. It is noted that in some example embodiments another computer vision library can be used in lieu of OpenCV. Additionally, in some example embodiments, an n-point model other than a seventy-eight (78) point model can be utilized.

Returning to process 1100. Process 1100 can implement facial morphing by morphing the following areas of the face: skin, lips, eyebrows, nose, etc. These morphs can be implemented using OpenGL on an iOS device in one example.

Figure 13:
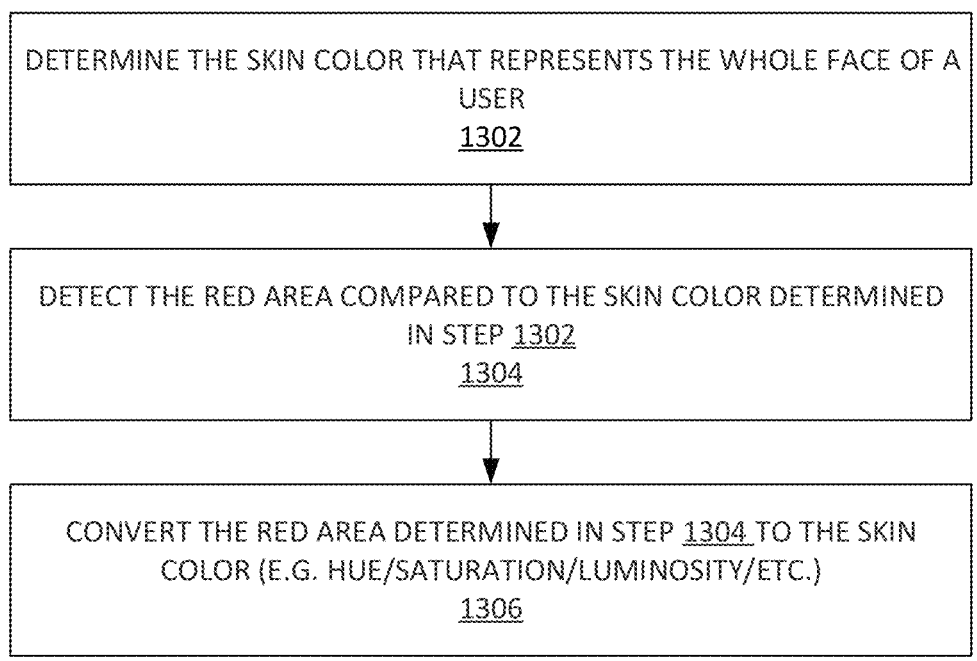
FIG. 13 illustrates an example process for removing acne effects from a digital image of a user, according to some embodiments.

Process 1100 can implement model retraining. Process 1100 can feed production images back into the model. This can enable process 1100 to retrain the model periodically and improve the detection of facial landmark features on a wider variety of user segments (e.g. various ages, ethnicities, lighting, etc.). It is noted that process 1100 can be modified to detect if the user is we FIG. 13 illustrates an example process 1300 for removing acne effects from a digital image of a user, according to some embodiments. Process 1300 can be used to remove the redness in a digital image of a user's face that is associated with acne.

In step 1302, process 1300 can determine the skin color that represents the whole face. In step 1304, process 1300 can detect the red area compared to the skin color. In step 1306, process 1300 can convert the area of step 1304 to the skin color (e.g. same hue/sat/lum/etc.).

Figure 14:
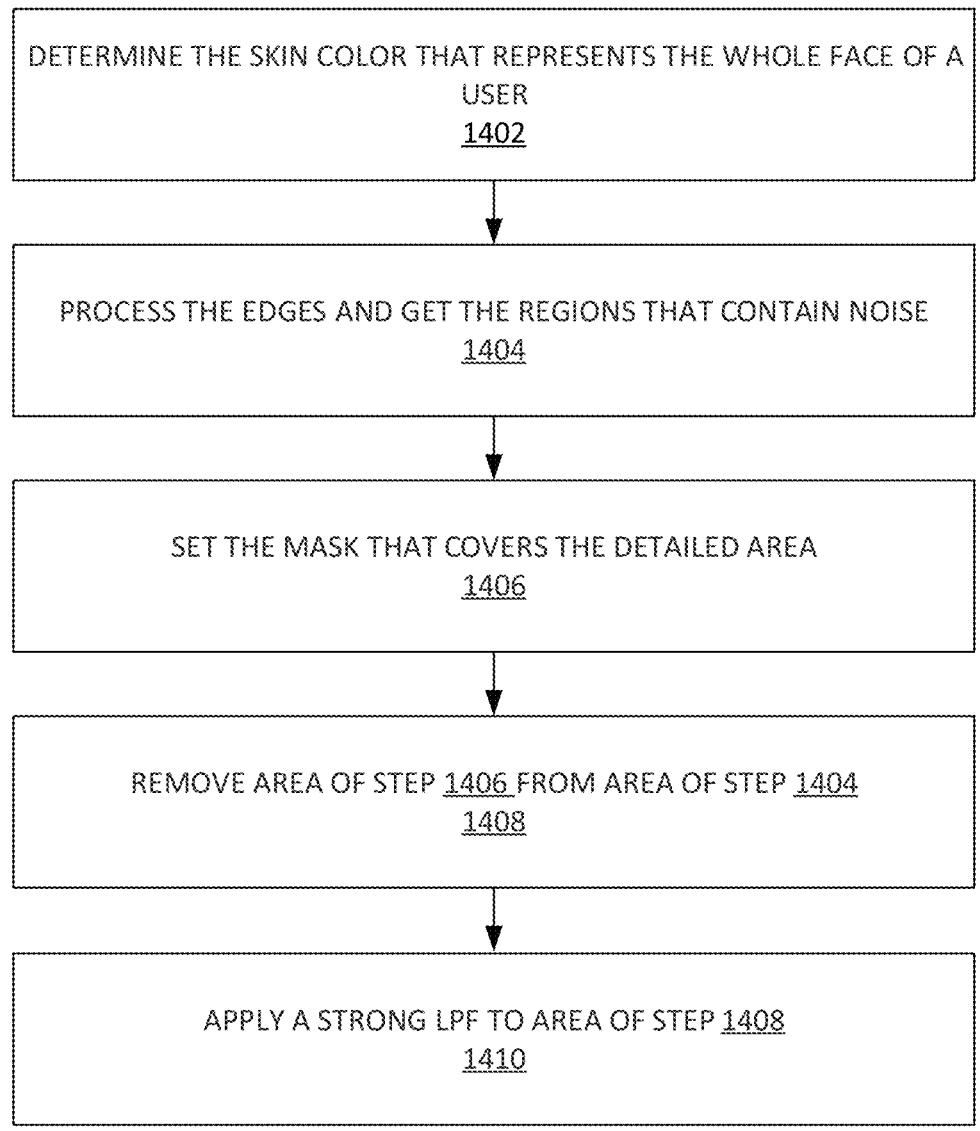
FIG. 14 illustrates an example process for smoothing skin effects in a digital image, according to some embodiments.

FIG. 14 illustrates an example process 1400 for smoothing skin effects in a digital image, according to some embodiments. Process 1400 can be used to smooth skin effects of a user's face in a digital image.

In step 1402, process 1400 can detect edges from a black and white digital image. The black and white digital image can be of a user's face. In step 1404, process 1400 can process the edges and get the regions that contain noise. In step 1406, process 1400 can set the mask that covers the detailed area (e.g. eyes, nose, and mouth). In step 1408, process 1400 can remove area of step 1406 from area of step 1404. In step 1410, process 1400 can apply a strong LPF to the area of step 1408.

Multipass ICP Methods

Disclosed are methods and systems for multi-pass ICP registration. A multi-pass ICP registration method can be used to improve the accuracy of registration for 3D point-set captured by AR (Augmented Reality) face tracking APIs. It is noted that, for face tracking APIs, such as ARKit, misalignment can occur when implementing the process provided supra. This can occur when the face mask is not aligned with the face in both image space and 3D space, or the face mask is aligned with the face in image space but shifted away from the face in 3D space. For example, ARKit may sometimes lose track while the user is in motion and misalignment may occur. Accordingly, when given two frames of point clouds, they can be transformed back to the canonical space by using the transformation matrix of their corresponding face masks. When this is done, the final point clouds may not align with each other. With large misalignment, if the point-to-plane ICP is performed to register the two-point clouds together, it can lead to a failure since the registration method critically relies on a rough alignment as initialization.

One solution can be to apply a 2-step ICP method. Instead of registering two-point clouds directly, the 2-step ICP method can first register each point cloud to its corresponding face mask to correct the misalignment. The initial poses of the two-point clouds can be roughly/substantially aligned.

The 2-step ICP method can then perform the point cloud-to-point cloud ICP. In this step, another ICP registration can be performed on the two corrected point clouds.

It is noted however, when registering the point clouds to their corresponding face masks, one may be correctly registered to its face mask, the other may fail. Accordingly, the final two corrected point clouds may still have a large misalignment. This may lead to an ICP failure.

Figure 15:
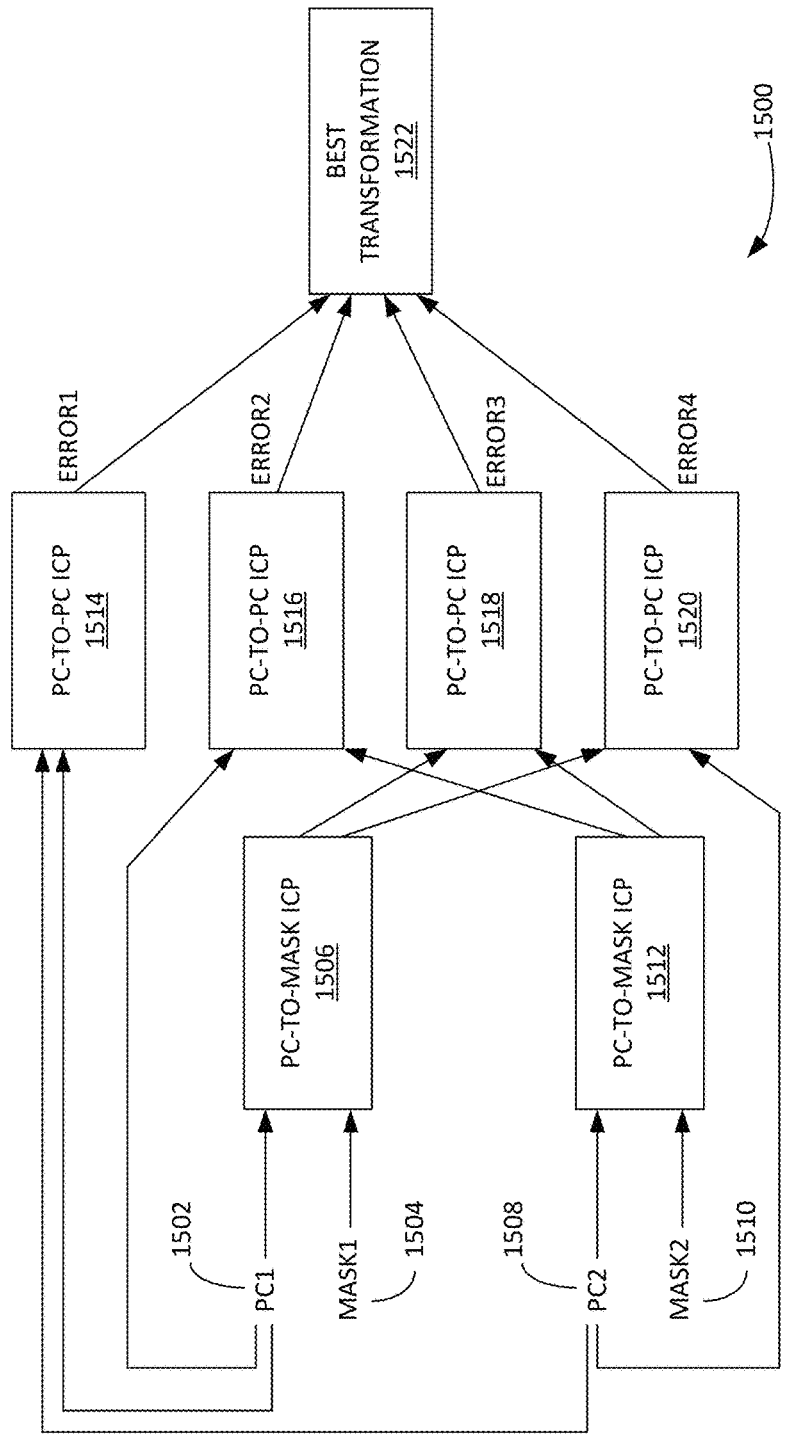
FIG. 15 illustrates an example multi-pass ICP registration process, according to some embodiments.

FIG. 15 illustrates an example multi-pass ICP process 1500, according to some embodiments. Multi-pass ICP process 1500 can utilize a first point cloud (PC1) 1502 and a second point cloud (PC2) 1508. Multi-pass ICP process 1500 can include face mask 1504 (mask1) and face mask 1510 (mask2). These can be ARKit facemasks.

Process 1500 can perform a PC-to-mask ICP operation in step 1506. Step 1506 can utilize PC1 1502 and face mask 1504. The output of step 1506 can be provided to step 1518. In step 1518, process 1500 performs a PC-to-PC ICP on the output of step 1506 and the output of step 1512. The output of step 1506 can be provided to step 1520. Step 1518 can output error 3 as a measure of its ICP registration accuracy.

In step 1520, process 1500 can perform PC-to-PC ICP on the output of step 1506 and PC2 1508. Step 1520 can output error 4 as a measure of its ICP registration accuracy.

In step 1512, process 1500 can perform PC-to-mask ICP on PC2 1508 and face mask 1510. PC1 1502 and the output of PC-to-mask ICP step 1512 can be provided to PC-to-PC ICP in step 1516. Step 1516 can output error 2 as a measure of its ICP registration accuracy.

In step 1514, process 1500 can perform PC-to-PC ICP on PC1 1502 and PC2 1508. Step 1514 can output error 1 as a measure of its ICP registration accuracy. In step 1522, process 1500 can select which transformation of error 1, error 2, error 3, or error 4 that has the lowest error.

In another example, process 1500 can implement multi-pass ICP. Since the registration method relies on the initial poses of the two input point clouds, here process 1500 can include four (4) passes with different initial poses of the two-point clouds as the inputs for the registration. In a first pass, a 1-step ICP is implemented (e.g. corresponding to step 1514 supra, etc.) to register the two-point clouds directly.

In a second pass, parallel 2-step ICPs are performed (e.g. corresponding to steps 1506 and 1512 supra, etc.). The 2-step ICPs can register each point cloud to its corresponding face mask to correct the misalignment. Then, the 2-step ICPs can perform the point cloud-to-point cloud ICP. Additionally, the 2-step ICPs can include a second ICP pass (e.g. step 1518 supra, etc.).

After these 2-step ICPs, process 1500 can implement two more ICP passes (e.g. in steps 1516 and 1520, etc.). On additional ICP pass (e.g. step 1516, etc.) can register the point cloud 1 with corrected point cloud 2. The other additional ICP pass (e.g. step 1520, etc.) can register the point cloud 2 with corrected point cloud 1. Each pass can output an error that measures the registration accuracy. The smaller the error, the better the ICP registration. Finally, process 1500 selects the transformation with the lowest error as the best transformation to register the two-point clouds (e.g. PC1 1502 and PC2 1508).

Figure 16:
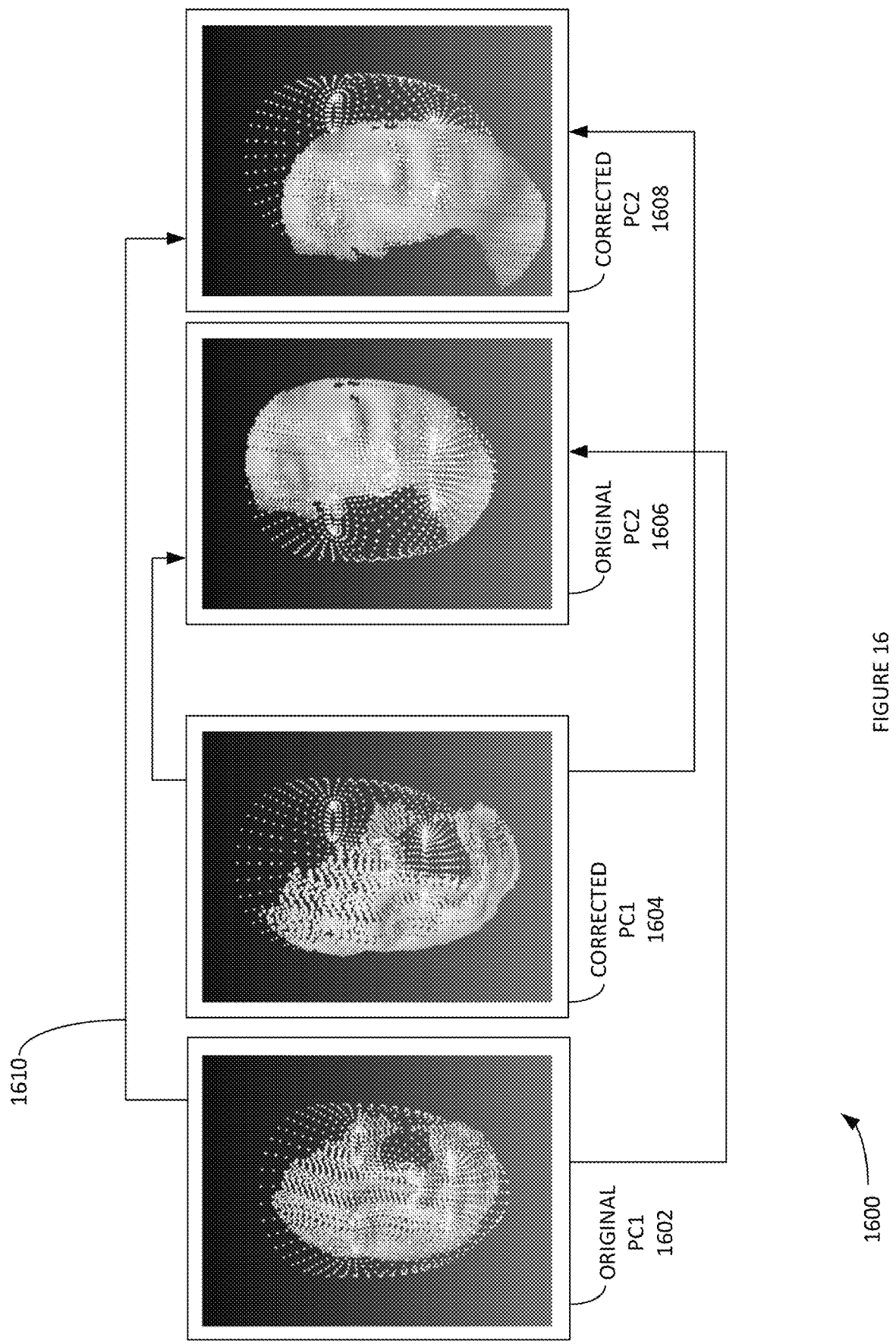
FIG. 16 illustrates an example of multi-pass ICP, according to some embodiments.

FIG. 16 illustrates an example multi-pass ICP 1600, according to some embodiments. As shown, the pass that registers the original point cloud 1 1602 to corrected point cloud 2 1608 has the lowest error and has the best transformation to register the two-point clouds (e.g. as opposed to the other transformation for corrected PC1 1604 original PC2 1606, etc.).

Figure 17:
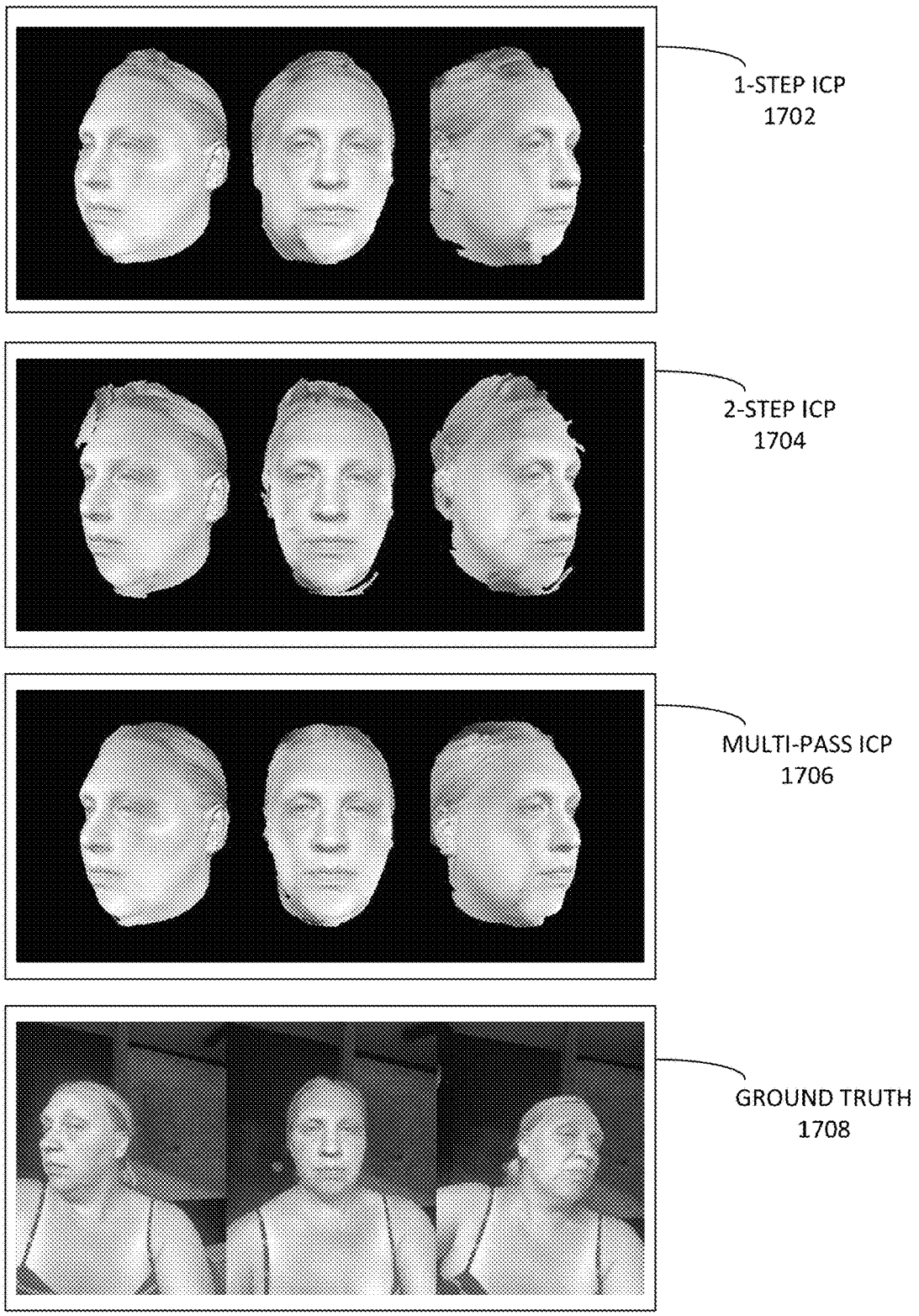
FIG. 17 illustrates an example set of comparisons among a set of ICP processes, according to some embodiments.

FIG. 17 illustrates an example set of comparisons 1700 among a set of ICP processes, according to some embodiments. Set of comparisons 1700 includes digital images showing the outputs of the various ICP registration processes. These include: 1-step ICP 1702, 2-step ICP 1704, multi-pass ICP 1706, and ground truth 1708. As shown, the multi-pass ICP 1706 solves the misalignment compared to other methods and is the closest to the ground truth.

Example Computing Systems

Figure 18:
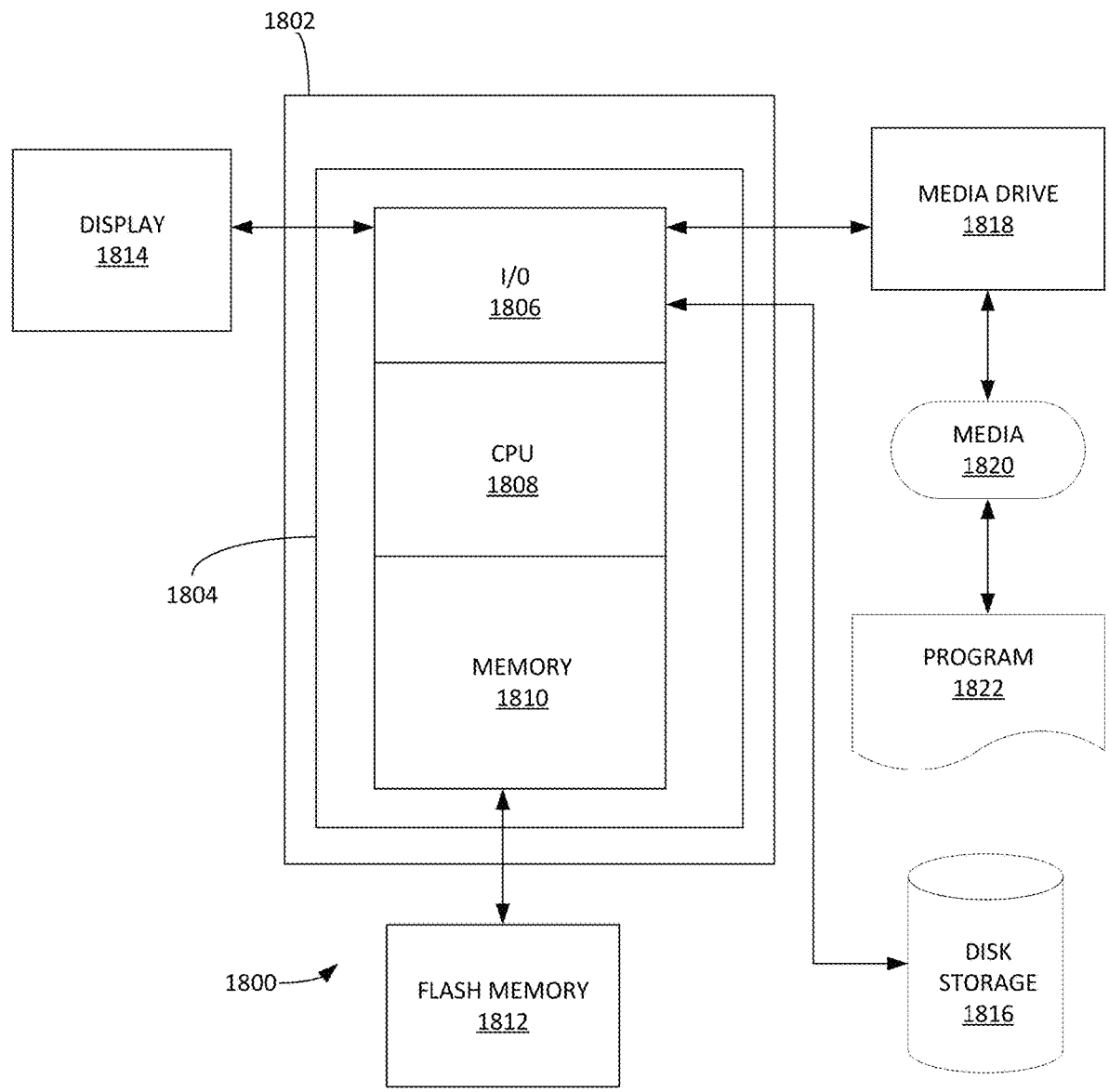
FIG. 18 depicts an exemplary computing system that can be configured to perform any one of the processes provided herein.

FIG. 18 depicts an exemplary computing system 1800 that can be configured to perform any one of the processes provided herein. In this context, computing system 1800 may include, for example, a processor, memory, storage, and I/O devices (e.g., monitor, keyboard, disk drive, Internet connection, etc.). However, computing system 1800 may include circuitry or other specialized hardware for carrying out some or all aspects of the processes. In some operational settings, computing system 1800 may be configured as a system that includes one or more units, each of which is configured to carry out some aspects of the processes either in software, hardware, or some combination thereof.

FIG. 18 depicts computing system 1800 with a number of components that may be used to perform any of the processes described herein. The main system 1802 includes a motherboard 1804 having an I/O section 1806, one or more central processing units (CPU) 1808, and a memory section 1810, which may have a flash memory card 1812 related to it. The I/O section 1806 can be connected to a display 1814, a keyboard and/or other user input (not shown), a disk storage unit 1816, and a media drive unit 1818. The media drive unit 1818 can read/write a computer-readable medium 1820, which can contain programs 1822 and/or data. Computing system 1800 can include a web browser. Moreover, it is noted that computing system 1800 can be configured to include additional systems in order to fulfill various functionalities. In another example, computing system 1800 can be configured as a mobile device and include such systems as may be typically included in a mobile device such as GPS systems, gyroscope, accelerometers, cameras, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine-accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for implementing a multi-pass iterative closest point (ICP) registration in an automated facial reconstruction process comprising:

providing an automated facial reconstruction process;

detecting that a face tracking application programming interface (API) misalignment has occurred during the automated facial reconstruction process;

implementing a multi-pass ICP process for the face tracking API misalignment by:

obtaining a first point cloud (PC1) of the automated facial reconstruction process;

obtaining a second point cloud (PC2) of the automated facial reconstruction process;

obtaining a first face mask (mask1) of the automated facial reconstruction process;

obtaining a second face mask (mask2) of the automated facial reconstruction process;

performing a first point cloud (PC1)-to-mask ICP operation by inputting and utilizing PC1 and mask1, wherein a transformation output of first PC-to-mask ICP operation is provided to a third PC-to-PC ICP and a fourth PC-to-PC ICP;

performing a second PC-to-mask ICP on PC2 and mask2, wherein a transformation output of the second PC-to-mask ICP step is provided to a second PC-to-PC ICP and to the third PC-to-PC ICP;

performing a first PC-to-PC ICP on the PC1 and the PC2, wherein the first PC-to-PC ICP outputs a first transformation of the first PC-to-PC ICP and a first error value of the first PC-to-PC ICP;

performing the second PC-to-PC ICP on the transformation output by the second PC-to-mask ICP and the PC1, wherein the second PC-to-PC ICP outputs a second transformation of the second PC-to-PC ICP and a second error value of the second PC-to-PC ICP;

performing the third PC-to-PC ICP on the transformation output of the first PC-to-mask ICP and the transformation output of the second PC-to-mask ICP, wherein the third PC-to-PC ICP outputs a third transformation of the third PC-to-PC ICP and a third error value of the third PC-to-PC ICP; and performing the fourth PC-to-PC ICP on the transformation output of the first PC-to-mask ICP and the PC2, wherein the fourth PC-to-PC ICP outputs a fourth transformation of the fourth PC-to-PC ICP and a fourth error value of the fourth PC-to-PC ICP.

2. The computerized method of claim 1 further comprising:

selecting a lowest error value ICP transformation of the first transformation, the second transformation, the third transformation, or the fourth transformation that has the lowest error value.

3. The computerized method of claim 1, wherein a face tracking APIs comprises an ARKit API.

4. The computerized method of claim 1, wherein the mask1 comprises an ARKit facemask, and wherein the mask2 comprises another ARKit facemask.

5. The computerized method of claim 1 further comprising:

outputting a lowest error value ICP transformation to an ARKit API.

6. The computerized method of claim 1, wherein an ICP comprises an algorithm employed to minimize a difference between two 3D Face Point Clouds.

7. The computerized method of claim 6, wherein the ICP is used to reconstruct 3D surfaces from a scan of a user's face.

8. The computerized method of claim 1, wherein a first point cloud (PC)-to-mask ICP operation comprises registering the PC1 to a corresponding face mask as mask1 to correct a misalignment.

9. The computerized method of claim 1, wherein a second point cloud (PC)-to-mask ICP operation comprises registering the PC2 to a corresponding face mask as mask2 to correct the misalignment.

\* \* \* \* \*